US007965900B2

(12) United States Patent
Maurer et al.

(10) Patent No.: US 7,965,900 B2
(45) Date of Patent: Jun. 21, 2011

(54) PROCESSING AN INPUT IMAGE TO REDUCE COMPRESSION-RELATED ARTIFACTS

(75) Inventors: Ron Maurer, Haifa (IL); Carl Staelin, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 935 days.

(21) Appl. No.: 11/862,125

(22) Filed: Sep. 26, 2007

(65) Prior Publication Data
US 2009/0080798 A1 Mar. 26, 2009

(51) Int. Cl.
*G06K 9/36* (2006.01)
*G06K 9/40* (2006.01)
*G06K 9/46* (2006.01)
(52) U.S. Cl. ......... 382/268; 382/232; 382/261; 382/275
(58) Field of Classification Search .................. None
See application file for complete search history.

(56) References Cited

U.S. PATENT DOCUMENTS

| 7,027,661 | B2 * | 4/2006 | Estevez et al. | 382/275 |
|---|---|---|---|---|
| 7,120,308 | B2 | 10/2006 | Guleryuz | |
| 2002/0131647 | A1 * | 9/2002 | Matthews | 382/268 |
| 2003/0081854 | A1 * | 5/2003 | Deshpande | 382/261 |
| 2003/0086623 | A1 * | 5/2003 | Berkner et al. | 382/260 |
| 2004/0240545 | A1 | 12/2004 | Guleryuz | |
| 2005/0013358 | A1 * | 1/2005 | Song et al. | 375/240.2 |
| 2005/0078872 | A1 | 4/2005 | Samadani et al. | |
| 2005/0094893 | A1 | 5/2005 | Samadani | |
| 2006/0153467 | A1 | 7/2006 | Staelin | |
| 2007/0036223 | A1 * | 2/2007 | Srinivasan | 375/240.18 |

FOREIGN PATENT DOCUMENTS
EP 1003334 5/2000

OTHER PUBLICATIONS

Jim Chou; Crouse, M.; Ramchandran, K "A simple algorithm for removing blocking artifacts in block-transform coded images". IEEE Signal Processing Letters, 1998, vol. 5 Issue:2 pp. 33-35.*
Hansen, M.; Wong, A.; Bishop, W "A Hardware Implementation of Real-Time Video Deblocking Using Shifted Thresholding", 2007 Canadian Conference on Electrical and Computer Engineering, pp. 28-31.* Chen, T.; Wu, H.R.; Qiu, B "Adaptive postfiltering of transform coefficients for the reduction of blocking artifacts", IEEE Transactions on Circuits and Systems for Video Technology, vol. 11, Issue: 5, 2001, pp. 594-602.*
Nosratinia, A. "Embedded Post-Processing for Enhancement of Compressed Images" Rice University, Houston. (Downloaded Sep. 26, 2007).
Cofman, R.R, and Dohono D.L. "Translation invariant de-noising" Yale and Stanford University (Downloaded Sep. 26, 2007).
Guleryuz, O.G. "Weighted Overcomplete Denoising" Epson Palo Alto Laboratory (Downloaded Sep. 26, 2007).

* cited by examiner

*Primary Examiner* — Samir A Ahmed
*Assistant Examiner* — Li Liu

(57) ABSTRACT

In a method for processing an input image to reduce compression-related artifacts, a plurality of block transforms of the input image having respective plurality of block-grid locations are generated, where each of the block-grid locations is shifted with respect to the block-grid locations in each of the other block transformed images. In addition, a plurality of respective intermediate transform domain filtered images having modified transform coefficients are generated. Per-pixel relative weights are assigned to each of the intermediate transform domain filtered images, where each of the intermediate transform domain filtered images has different contexts, and where the per-pixel relative weights are adaptive to the local context in each of the intermediate transform domain filtered images. Moreover, a weighted average of inverse-transforms of the intermediate transform domain filtered images from the per-pixel relative weights to produce an artifact-reduced image is calculated and the artifact-reduced image is outputted.

20 Claims, 8 Drawing Sheets

PROCESSING AN INPUT IMAGE TO REDUCE COMPRESSION-RELATED ARTIFACTS

BACKGROUND

Digital images and video frames are typically compressed in order to reduce data storage and transmission requirements. In most image compression methods, certain image data is selectively discarded to reduce the amount of data needed to represent the image, while avoiding substantial degradation of the appearance of the image.

FIG. 1 shows a flow diagram of a conventional method of processing an original image 10 to produce a compressed image 12. As shown in FIG. 1, a forward transform 14 is applied to the original image 10 to produce a set of forward transform coefficients 16. The forward transform 14 may be any type of transform that is operable to convert the original image 10 into a set of coefficients in a selected domain. A quantizer 18 is applied individually to the forward transform coefficients 16 to produce a set of quantized forward coefficients 20. The quantizer 18 discards some of the forward transform coefficient information, enabling the original image 10 to be compressed. An encoder 22 encodes the quantized forward transform coefficients using any type of lossless encoding technique to produce the compressed image 12.

The original image 10 may be a binary image (for instance, a dark and bright dot pattern), a multilevel single-color image (for instance, a gray-level image), or a multilevel multi-color image. In general, the image compression process of FIG. 1 is applied individually to each color plane of the original image 10.

FIG. 2 shows a flow diagram of a conventional block-transform-based image method of compressing an original image 10. As shown in FIG. 2, the original image 10 is initially converted into a preselected luminance-based color space (for instance, the YCrCb color space), if the original image 10 is not already specified in the preselected color space (block 24). Each color plane of the image in the preselected color space corresponds to a respective image (that is, an array of pixel values) that is processed individually as follows. The color components (for instance, the Cr and Cb color components) are downsampled (block 26). Each color plane is divided into blocks of pixels (for instance, 8×8 pixel blocks) (block 28). A block transform is applied to each pixel block individually (block 30). Any suitable type of block transform may be applied to the blocks. Exemplary types of block transforms include the cosine transform, Fourier transform, Hadamard transform, and Haar wavelet transform. The resulting transform coefficients are quantized (block 32). In addition, the quantized transform coefficients are encoded using a lossless coding technique to produce compressed image 12 (block 34).

To further illustrate the process depicted in FIG. 2, a particular example is provided in which the original image 10 is denoted as u and the compressed image 12 is denoted as f, which has been distorted during the compression process. The effect of the lossy part of a JPEG compression depends on the form of the block transform 30 used, which is characterized by a 64×64 2D-DCT transform matrix D and by an 8×8 quantization table Q. Both the transform matrix D and the quantization table Q are assumed to be known. In addition, the transform matrix D is typically the standard DCT-II transform, but it may be approximated in a form that may be implemented by fast integer-arithmetic as supported by the JPEG standard.

In this example, the following notations are used to mathematically describe the JPEG operation on image pixels of an image. The following notations are also used to describe the transform-domain filters employed later in the artifact reduction. The bold letters represent 2D indices, for instance, $n=(n_x,n_y)$. JPEG divides the image having a size of $(N_x,N_y)$ into 8×8 blocks. As such, each pixel-address n is split into a block index b and location within the block m, such that $n=8b+m$. The DCT coefficient index will be usually be denoted as $k=(k_x,k_y)$. The output of the standard JPEG decoder f(b,m) at block b and relative location m is expressed as:

$$f(b, m) = \sum_k D^t_{m,k} Q_k \left[ \frac{1}{Q_k} \sum_j D_{k,j} u(b, j) \right] \forall\, b, \quad \text{Equation (1)}$$

where the square brackets indicate that the values contained therein are to be rounded to the nearest integer.

The quantization of the DCT coefficients 32 tends to generate mainly two types of artifacts, blocking and ringing artifacts. In blocks containing strong features (for instance, edges, lines, etc.), there is typically a large percentage of high frequency DCT components with substantial magnitudes. Some of these coefficients may fall under the relative quantization thresholds, thereby being zeroed out, while others survive. The unbalanced combination of post-quantization high-frequency components leaves patterns called "mosquito" or "ringing" artifacts, which resemble DCT-basis components. Ringing artifacts are more probable in pixels around a block center than in pixels near block-boundaries. Blocking artifacts generally originate from the fact that the quantization errors for pixels belonging to two neighboring blocks are not correlated. Blocking artifacts are known to originate mainly from quantization errors related to lower-frequency components, and to occur mainly near block boundaries.

Various image restoration algorithms have been proposed to overcome these image artifacts. One class of image restoration algorithms referred to as "overcomplete transform-domain filtering" is known to reduce blocking artifacts due to its ability to approximately restore the translation invariance of local-differences in the image statistics (the translation invariance was lost by the block-transform coding). The principle under these algorithms is to apply block-transform filters with block-grids aligned on different positions (shifts), and then to average the resulting outputs, which has been referred to as so-called "cycle-spinning" approach.

In a shifted block-grid, every pixel address n can be expressed by the shift s to the first block boundary, the block index b and location within the block m in the following fashion: $n_s=8b+m+s$. A block-transform filter is defined by the block-transform T employed and by a set of non-linear mappings $\psi_k$ that are each applied to their corresponding transform coefficient k. The mappings may correspond, for example, to soft or hard thresholding or quantization, and each of them is characterized by some scale parameter $\sigma_k$. Hence a block-transform filter with block boundaries at shift s is given by:

$$\hat{u}_s(b,m) = \Sigma_k T_{m,k}{}^t \psi_k(\sigma_k \| \Sigma_j T_{k,j} f_s(b,j))) \forall\, b,s. \quad \text{Equation (2):}$$

The output of the cycle-spinning filter at each pixel is given by spatially averaging contributions from all shifts.

Unfortunately, the so-called "cycle-spinning" approach only partially reduces the ringing artifacts since in the shifts that contain a strong edge, the block-transform filter does not reduce ringing effectively. In addition, the surviving artifacts in these shifts are averaged into the final result, thus leaving residual ringing artifacts.

Guleryuz proposed a solution to this problem in the context of image denoising by introducing selectivity into the averaging process in order to reject "bad shifts". See, O. G. Guleryuz, "Weighted Overcomplete Denoising", "Conference Record of the Thirty-Seventh Asilomar Conference on Signals, Systems and Computers," Nov. 9-12, 2003, Vol. 2, pp. 1992-1996, and also U.S. Patent Application Publication No. 2004/0240545(A1) to Guleryuz. More particularly, Guleryuz introduced per-pixel weighting of shifts, where the weights were determined by formulating the weighted combination as a linear estimation problem and solving it for the individual pixel-wise weight factors. Guleryuz's solution employs many statistical assumptions and approximations that are valid only for independent identically distributed (i.i.d.) noise. Guleryuz's solution, however, is not suitable for JPEG images since the statistics of the distortion corresponding to JPEG compression artifacts due to transform coefficient quantization are both spatially varying and signal dependent, namely, non-i.i.d.

An improved approach to eliminating compression artifacts in images, and more particularly, in JPEG images would therefore be beneficial.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are systems and methods designed to reduce compression artifacts that are inherently introduced by processes used to create lossily compressed images. In one respect, the systems and methods disclosed herein are designed to reduce image compression artifacts in a computationally efficient manner without substantially degrading image quality. More particularly, for instance, the systems and methods disclosed herein are designed to substantially reduce ringing and blocking compression artifacts that are typically introduced by block-transform-based image compression techniques, such as block discrete cosine transform (DCT) image compression techniques. It should, however, be understood that the artifact reduction techniques disclosed herein may readily be used to reduce artifacts in images compressed by other non-block-transform-based lossy image compression techniques.

The present disclosure includes many of the same figures and corresponding descriptions as originally presented in commonly assigned U.S. patent application Ser. No. 10/696,140, filed by Ramin Samadani on Oct. 29, 2003 (hereinafter the "'140 Application"). The '140 Application was published as U.S. Patent Application Publication No. 2005/0094893 on May 5, 2005. Some of the disclosure from the '140 Application is reproduced herein to provide a detailed understanding of how parts of the systems and methods disclosed herein operate. The systems and methods disclosed herein, however, differ from the disclosure contained in the '140 Application in many respects.

In the '140 Application, the pixel contexts in which local activity measures are calculated are fixed in each of the shifts (or intermediate images). In particular, the activity measure contexts are centered around the pixel of interest and thus, the activity measures in all of the shifts refer to the same spatial context, that is, the same sets of pixels.

Figure 7:
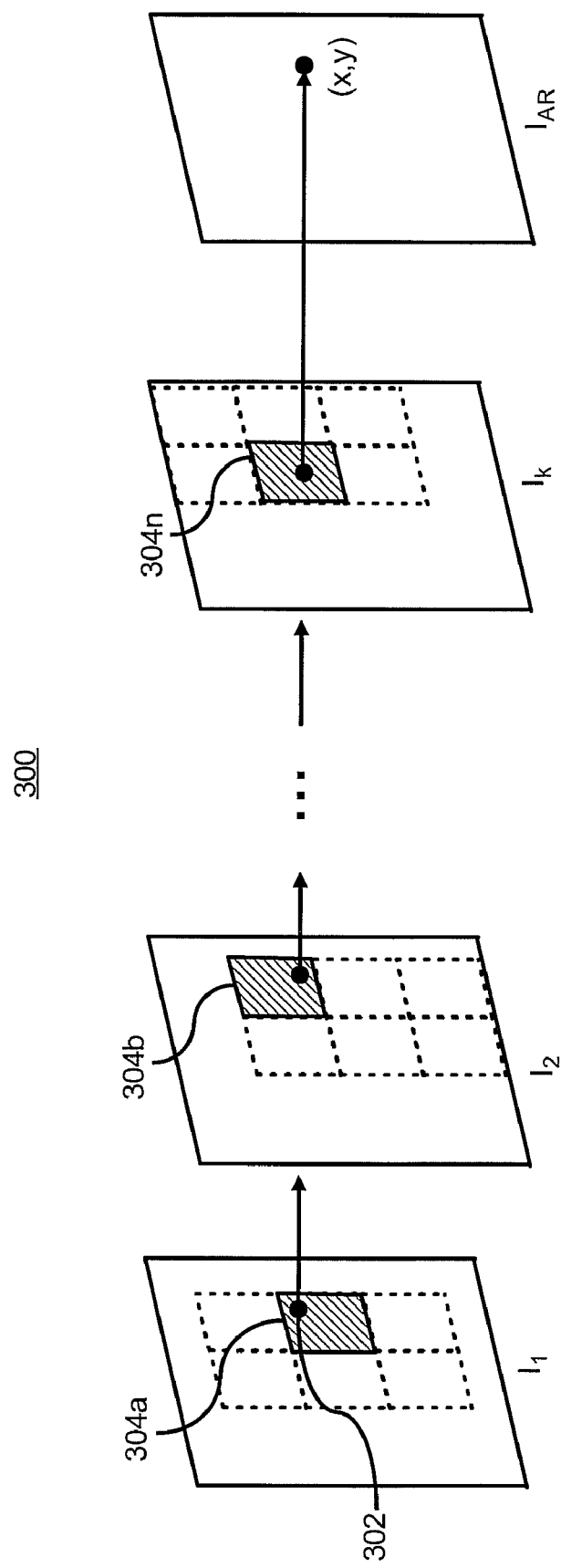
FIG. 7 shows a diagrammatic view of a set of intermediate images and a ringing corrected image generated from the set of intermediate images, according to embodiments of the invention.

In contrast, in the presently disclosed systems and methods the local-activity context for a given pixel varies in each of a plurality of block-grid shifts. In particular, the activity context per each block-grid shift corresponds to a different context of pixels that includes the pixel of interest but is not centered around it, hence the activity measures in all of the block-grid shifts refer to different spatial contexts, that is, to different sets of pixels (see FIG. 7).

The activities are measured in a block-wise manner and are not centered around a pixel of interest and thus, the pixel of interest has a different context, for instance, a different 8×8 block, for each block-grid shift. As such, for a pixel located on a first side of an edge, some of the shifted contexts may include pixels on a second side of the edge, which may lead to relatively large activity measures, while some other shifted contexts may include only pixels on the first side of the edge, which are more likely to have relatively similar intensities as the pixel of interest.

In these instances, the candidate reconstructions or intermediate images, which are used interchangeably herein, of the block-grid shifts that do not include the edge are preferred (or more heavily weighted, as discussed below) over those shifts that include the edge to thus reduce the possibility that the pixels on the second side of the edge cause the reconstructed edge to be blurred. As such, the block-wise activity measures implemented in the systems and methods disclosed herein substantially eliminate the undesired coupling between ringing artifact reduction and edge-blurring.

In addition, in instances where a partial artifact reduction is needed, the systems and methods disclosed herein may use a part of the total number of possible block-grid shifts (64 shifts for 8×8 blocks) while still providing a relatively high level of artifact reduction. In one respect, the average computational efficiency per batch of images may therefore be improved without a high level of sacrifice in artifact reduction. Accordingly, the block-wise activity measurements need not be determined separately for each of the pixels contained in a block.

Figure 3:
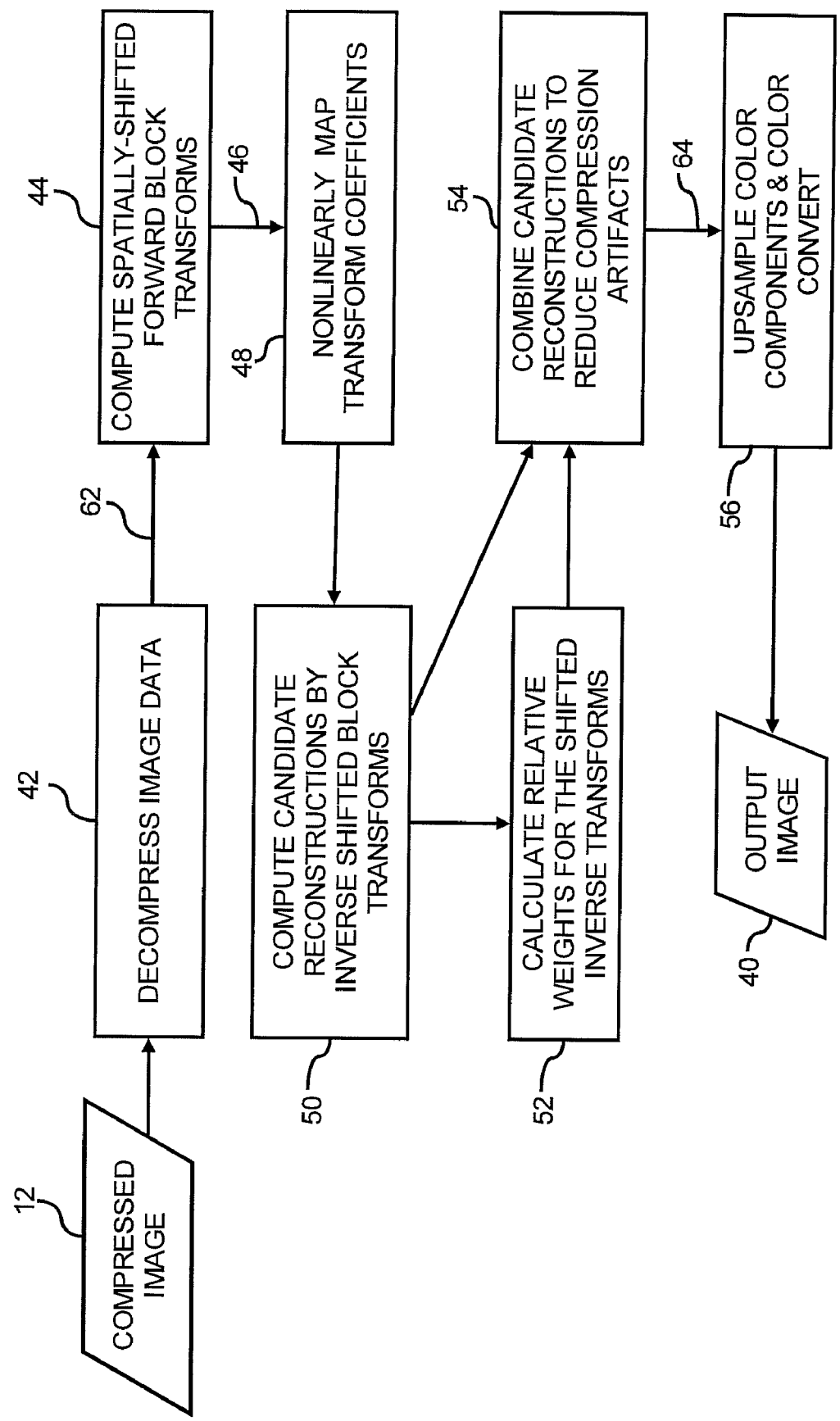
FIG. 3 shows a flow diagram of a method for processing an input image to reduce compression-related artifacts, according to an embodiment of the invention.

With reference first to FIG. 3, there is shown a flow diagram of a method for processing an image 12, to produce an output image 40 with reduced compression-related artifacts, according to an example. It should be apparent to those of ordinary skill in the art that the method depicted in FIG. 3 represents a generalized illustration and that other steps may be added or existing steps may be removed, modified or rearranged without departing from a scope of the method.

Figure 1:
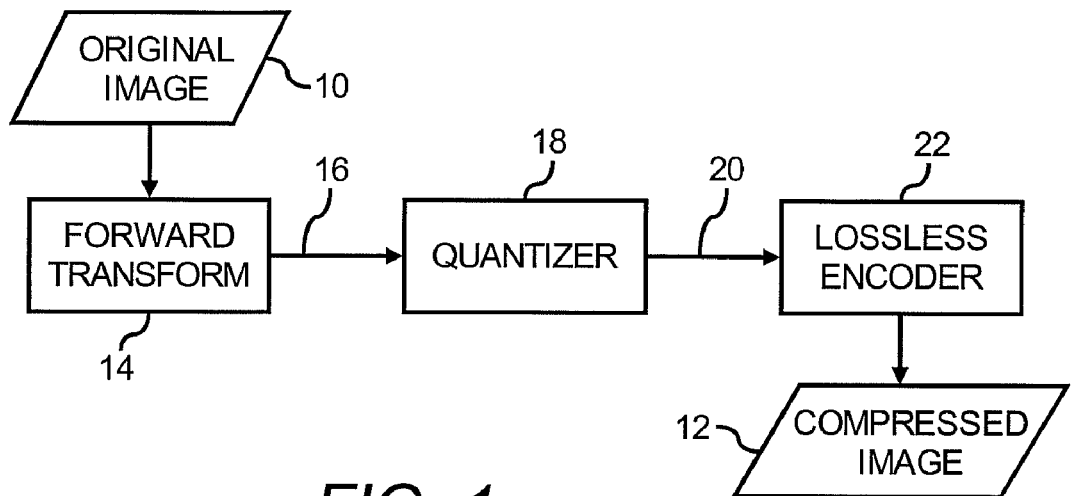
FIG. 1 depicts a flow diagram of a conventional method of processing an original image to produce a compressed image.
Figure 2:
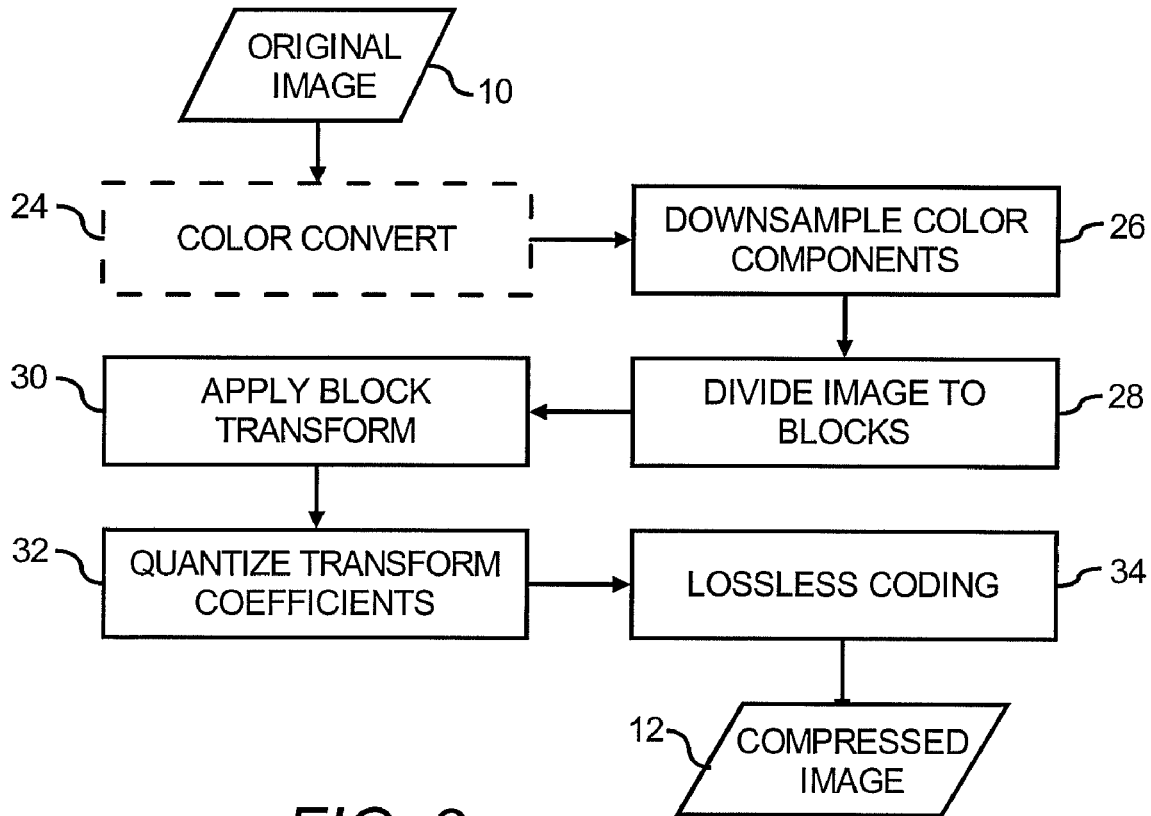
FIG. 2 shows a flow diagram of a conventional block-transform-based method of compressing an original image.

According to an example, the image 12 may comprise a compressed image 12 that has been generated by the block-transform-based image compression method of FIG. 2. In any regard, each color-component plane of the compressed image 12 is processed individually. The compressed image data initially is decompressed (block 42). Spatially-shifted forward transforms are computed from the decompressed image data 62 (block 44). More particularly, a forward transform operation is applied to each of multiple versions of the decompressed image data 62 having shifted block-grids to produce multiple respective sets of forward transform coefficients 46. For example, in an implementation in which the image 12 is compressed based on blocks of M×N pixels, the forward transform operation is applied to the decompressed image data 62 on a subset containing K shifts from the M×N independent shifts possible in an M×N transform to produce K sets of forward transform coefficients, where K, M, and N have integer values of at least 1. According to an example, both M and N have a value of 8.

The forward transform coefficients 46 of each set are nonlinearly mapped (block 48) to generate a plurality of respective intermediate transform domain filtered images having modified transform coefficients of the decompressed input image data 62. In one embodiment, an inverse block-transform operation (block 50) is applied to intermediate transform domain filtered images to produce respective candidate reconstructions. Relative per-pixel weights ($w_s(b,m)$) for the candidate reconstructions that correspond to the respective confidence levels of each of the shifted inverse transforms (or intermediate images) are calculated (block 52). As explained in detail below, the candidate reconstructions are combined by weighted averaging using the per-pixel relative weights ($w_s(b,m)$) to reduce compression artifacts in each color plane 64 (block 54). The color component image planes (for instance, Cr and Cb) may be upsampled to the original resolution, if needed, and the resulting image planes are converted back to the color space (for instance, the Red-Green-Blue color space) of the original image 10 (block 56). The image planes are then combined to produce the output image 40.

The per-pixel relative weights ($w_s(b,m)$) have been described with respect to FIG. 3 as being calculated based upon the plurality of intermediate images generated from the inverse transforms of the intermediate transform domain filtered images of the decompressed input image data 62. It should, however, be understood that the per-pixel relative weights ($w_s(b,m)$) may be calculated based upon the intermediate transform domain filtered versions of the decompressed input image data 62 and that the inverse transforms of the intermediate transform domain filtered images of the decompressed input image data 62 may be computed following the calculation of the relative-per pixel weights without departing from a scope of the method depicted in FIG. 3.

Furthermore, for some embodiments where the per-pixel relative weights $w_s(b,m)$ are uniform across each block for a given block-grid shift, the weighting of the shifted candidate reconstructions may be applied in an interleaved fashion with the inverse transforms implemented in a separable fashion without changing the final output, thereby allowing computational savings as demonstrated in co-pending and commonly assigned U.S. Patent Application Publication No. 2006/0153467, entitled "Enhancement of Digital Images," filed on Jan. 11, 2005, by Carl Staelin, the disclosure of which is hereby incorporated by reference in its entirety. Hence, interleaving part of the computational steps of the inverse transform and the application of per-pixel relative weighting does not depart from the scope of the invention.

Figure 4:
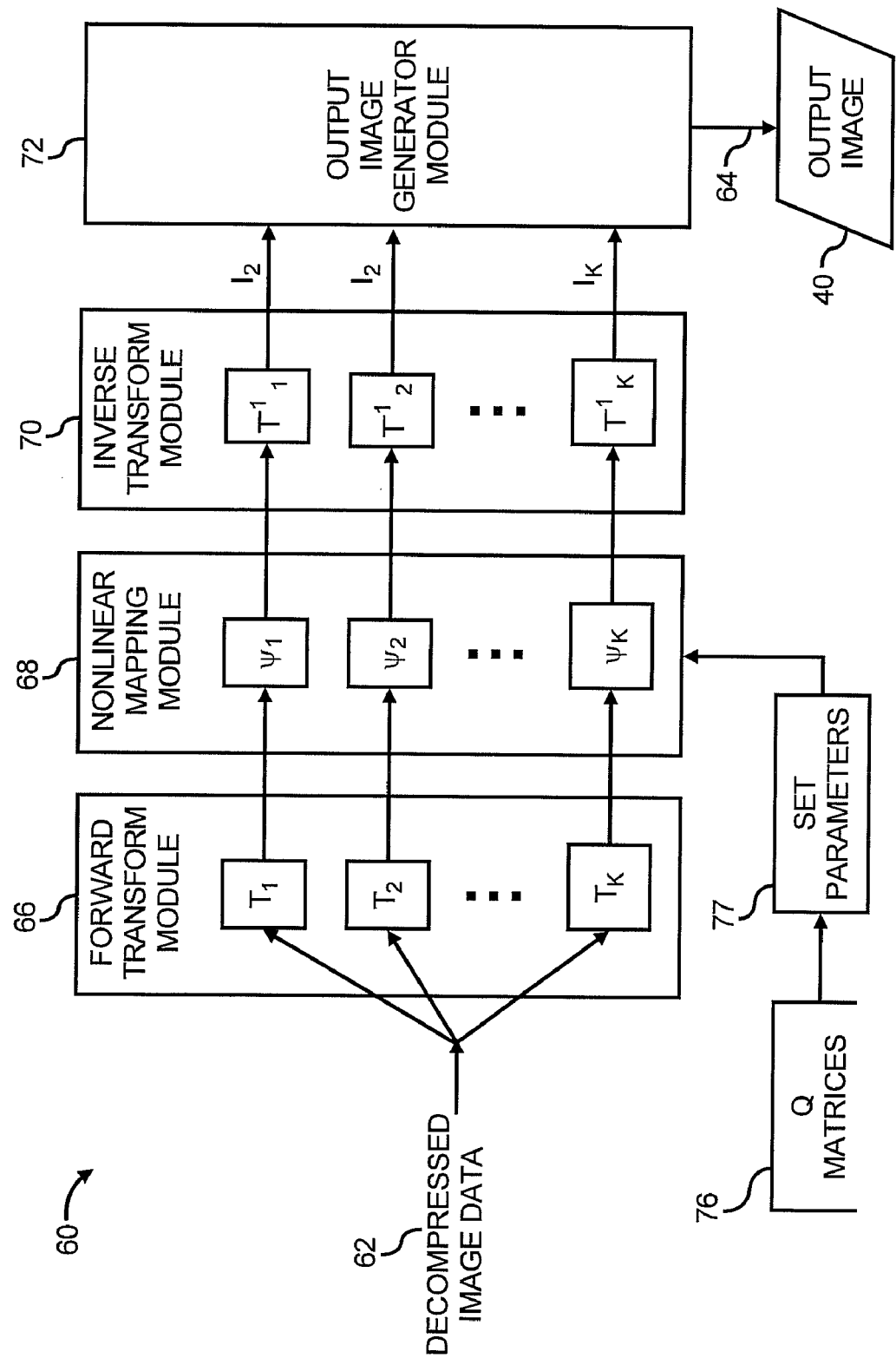
FIG. 4 shows a system for processing the decompressed image data generated by the method of FIG. 3 to produce a compression-artifact-reduced output image, according to an embodiment of the invention.

Turning now to FIG. 4, there is shown a system 60 for processing the decompressed image data 62 generated by the method of FIG. 3 to produce the compression-artifact-reduced output image 40, according to an example. It should be understood that the system 60 may include additional components and that some of the components described herein may be removed and/or modified without departing from a scope of the system 60.

As shown in FIG. 4, the processing system 60 includes a forward transform module 66, a nonlinear mapping module 68, an inverse transform module 70, and an output image generator module 72. In general, the modules 66-72 of system 60 are not limited to any particular hardware or software configuration, but rather they may be implemented in any computing or processing environment, including in digital electronic circuitry or in computer hardware, firmware, device driver, or software. For example, in some implementations, these modules 66-72 may be embedded in the hardware of any one of a wide variety of electronic devices, including digital cameras, printers, and portable electronic devices (for instance, mobile phones and personal digital assistants). In addition, although full (or complete) input images are processed in the illustrated examples, other examples may be configured to sequentially process a series of sub-image portions (for instance, swaths) of an input image.

The forward transform module 66 computes from the decoded image data 62 into K sets ($T_1, T_2, \ldots, T_K$) of shifted forward block-transforms, corresponding to K unique positions of a blocking grid relative to the decompressed image 62. The forward block-transforms typically belong to the class of orthogonal transforms, more particularly, discrete cosine transform (DCT) or an approximation of the DCT that may be implemented efficiently using integer arithmetic. Yet other transforms, however, may be used to trade-off filtering quality against computational efficiency.

The nonlinear mapping module 68 nonlinearly maps the output transform coefficients that are computed from the sets ($T_1, T_2, \ldots, T_K$) of shifted forward transforms that are computed by the forward transform module 66.

Figure 5A:
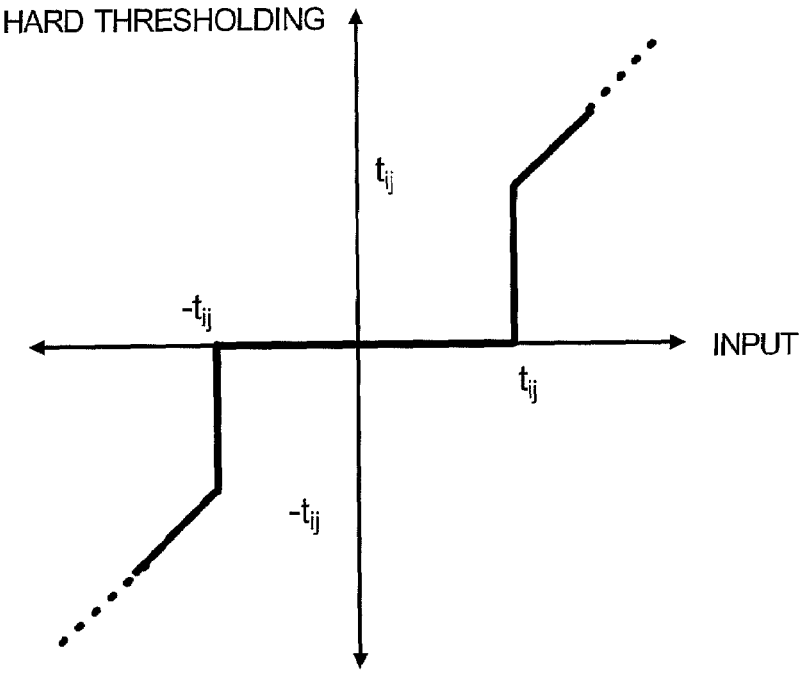
FIGS. 5A and 5B, respectively, show graphs of nonlinear mappings used in an implementation of the nonlinear mapping module depicted in FIG. 4 to map input transform coefficient values to output transform coefficient values, according to embodiments of the invention.

Referring to FIG. 5A, there is shown a graph 80 of hard-threshold output in an implementation of the nonlinear mapping module depicted in FIG. 4 plotted as a function of input transform coefficient values, according to a example. In some examples, the sets of forward transform coefficients are mapped in accordance with respective nonlinear thresholding mappings ($\psi_1, \psi_2, \ldots, \psi_K$). In particular, the forward transform coefficients are nonlinearly mapped by setting to zero each coefficient with an absolute value below a respective threshold ($t_{ij}$, where i, j refer to the indices of the quantization element, with i having values in the range of 0 to M−1 and j having values in the range of 0 to N−1) and leaving unchanged each coefficient with an absolute value equal to or above a respective threshold ($t_{ij}$). Quantization matrices 76 (or "Q Matrices") are used to set the parameters $t_{ij}$ for the nonlinear hard threshold mappings ($\psi_1, \psi_2, \ldots, \psi_K$). In some implementations, the quantization matrices contain the same quantization parameters $q_{ij}$ that were originally used to compress the compressed image 12. In other cases, they may be scaled by some gain factors $p_{ij}$ (different for each DCT), for instance, to accentuate or de-accentuate the filtering of certain frequencies. These quantization parameters $q_{ij}$ may be stored in the compressed image 12 in accordance with a standard image compression scheme (for instance, JPEG).

Figure 5B:
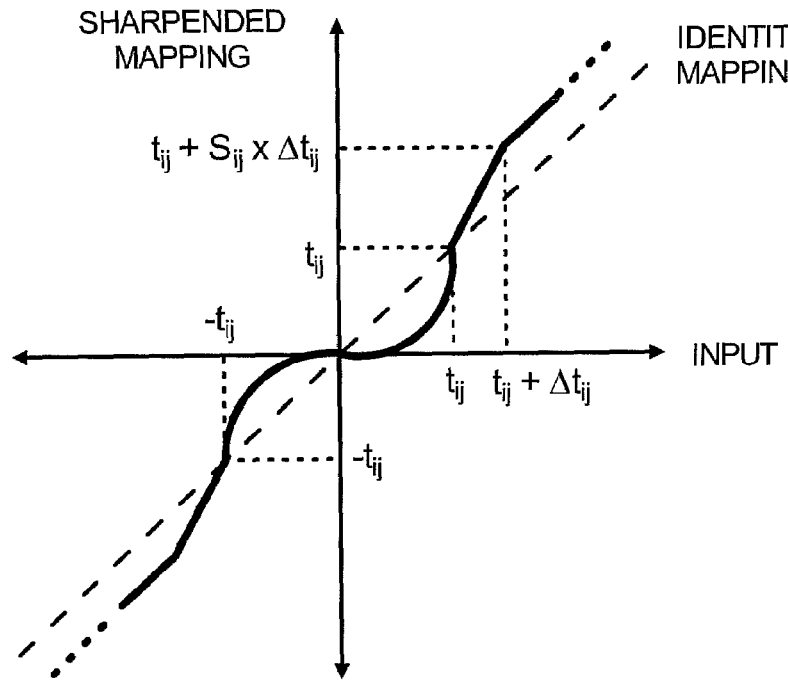

In various instances, the nonlinear mapping module 68 also incorporates sharpness enhancements by modifying the non-linearities, $\psi_n$. In particular, as shown in the graph 90 in FIG. 5B, the nonlinear mapping module 68 may replace the thresholding mapping between 0 and $t_{ij}$ by a power-law relation $\psi_n$ $(x) = \text{sign}(x) \times t_{ij} \times |x/t_{ij}|^{P_{ij}}$ where P>1 (for P much larger than 1, the power-law relation approaches the Hard-threshold formula). In addition, the slope $S_{ij}$ from $t_{ij}$ to $t_{ij} + \Delta t_{ij}$ is made larger than 1 to induce sharpening by different amount to different transform coefficients. Then from $t_{ij} + \Delta t_{ij}$ onwards the slope remains in unity, so that there is a fixed additive gain of the output relative to input values above $t_{ij} + \Delta t_{ij}$. For instance, values of $2 \leq P_{ij} \leq 3$, and $1.2 \leq S_{ij} \leq 2$ provide adequate sharpness to compensate for the slight blurring that might be caused by the output image generator methods.

The "identity mapping" depicts a reference line. On the positive (negative) side of the axes, the area below (above) the reference line indicates a weakening of the coefficient magnitude that corresponds to local smoothing and the area above (below) the reference line indicates an increasing of the coefficient magnitude that corresponds to local sharpening.

The inverse transform module 70 computes sets ($T^{-1}_1$, $T^{-2}_2, \ldots, T^{-1}_K$) of inverse block transforms from the sets of nonlinearly mapped forward transform coefficients. The inverse transform module 70 applies the inverse of the forward block transform operation that is applied by forward transform module 66. The outputs of the inverse transform module 70 are intermediate images ($I_1, I_2, \ldots, I_K$) representing the image data in the spatial domain.

The output image generator module 72 combines the intermediate images ($I_1, I_2, \ldots, I_K$) to form the image planes 64 of the final output image 40. In general, the output image generator module 72 computes output image 40 based on a per-pixel weighted average of intermediate images ($I_1, I_2, \ldots, I_K$) As disclosed below with respect to FIGS. 6A and 6B, the output image generator module 72 includes a local weights generator 110 and a weighted average generator 120. Various manners in which the output image generator module 72 operates are described in greater detail with respect to the following figures.

Figure 6A:
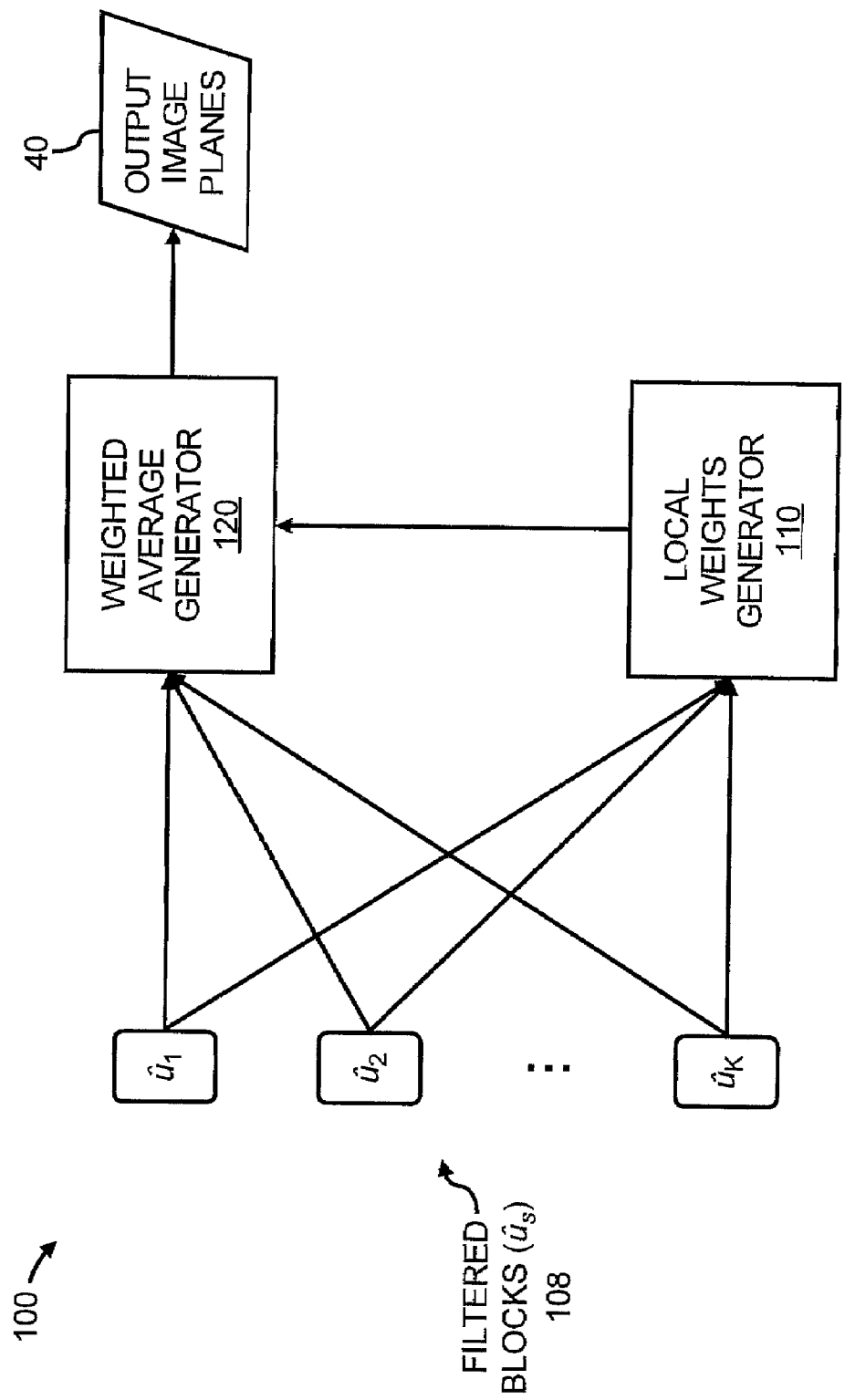
FIGS. 6A and 6B show respective block diagrams of a system for processing an input image to reduce compression-related artifacts, according to embodiments of the invention.

FIG. 6A shows a block diagram of a system 100 for processing an input image 12, according to an example. The block diagram depicted in FIG. 6A provides a more detailed illustration of various operations performed by some of the modules in the processing system 60 depicted in FIG. 4 in performing the method depicted in FIG. 3. It should be understood that the system 100 may include additional components and that some of the components described herein may be removed and/or modified without departing from a scope of the system 100.

Generally speaking, the system 100 for processing an input image 12 operates to reduce both blocking and ringing artifacts that are inherently introduced during compression operations. As shown in FIG. 6A, each filtered block or candidate reconstruction $\hat{u}_s$ (b,m), which are used interchangeably herein, obtained by a transform-domain filter with block-grid shifted by s is attributed a pixel-wise weight $w_s$(b,m) that corresponds to the confidence of that candidate reconstruction $\hat{u}_s$(b,m) relative to other candidate reconstructions ($\hat{u}_{s1}$(b,m), $\hat{u}_{s2}$(b,m), \ldots, $\hat{u}_{sk}$(b,m)) at different block-grid shifts s1-sk. As discussed above, b is the block-index of a pixel of interest, m is the block in which the pixel of interest is located, such that n=8b+m, where n is a pixel address, and s denotes the shift of the block-transform grid, for instance, characterized by vertical and horizontal shifts, such as, between 0 to 7 pixels. The general expression for the artifact-reduced image $\hat{u}_{AR}$(n) is:

$$\hat{u}_{AR}(n) = \frac{\sum_s \sum_{b,m} \delta(n, 8b+m+s) \cdot w_s(b,m) \cdot \hat{u}_s(b,m)}{\sum_s \sum_{b,m} \delta(n, 8b+m+s) \cdot w_s(b,m)}, \quad \text{Equation (3)}$$

where $\delta(n1,n2)$ is 1 if n1=n2 and 0 otherwise.

Figure 6B:
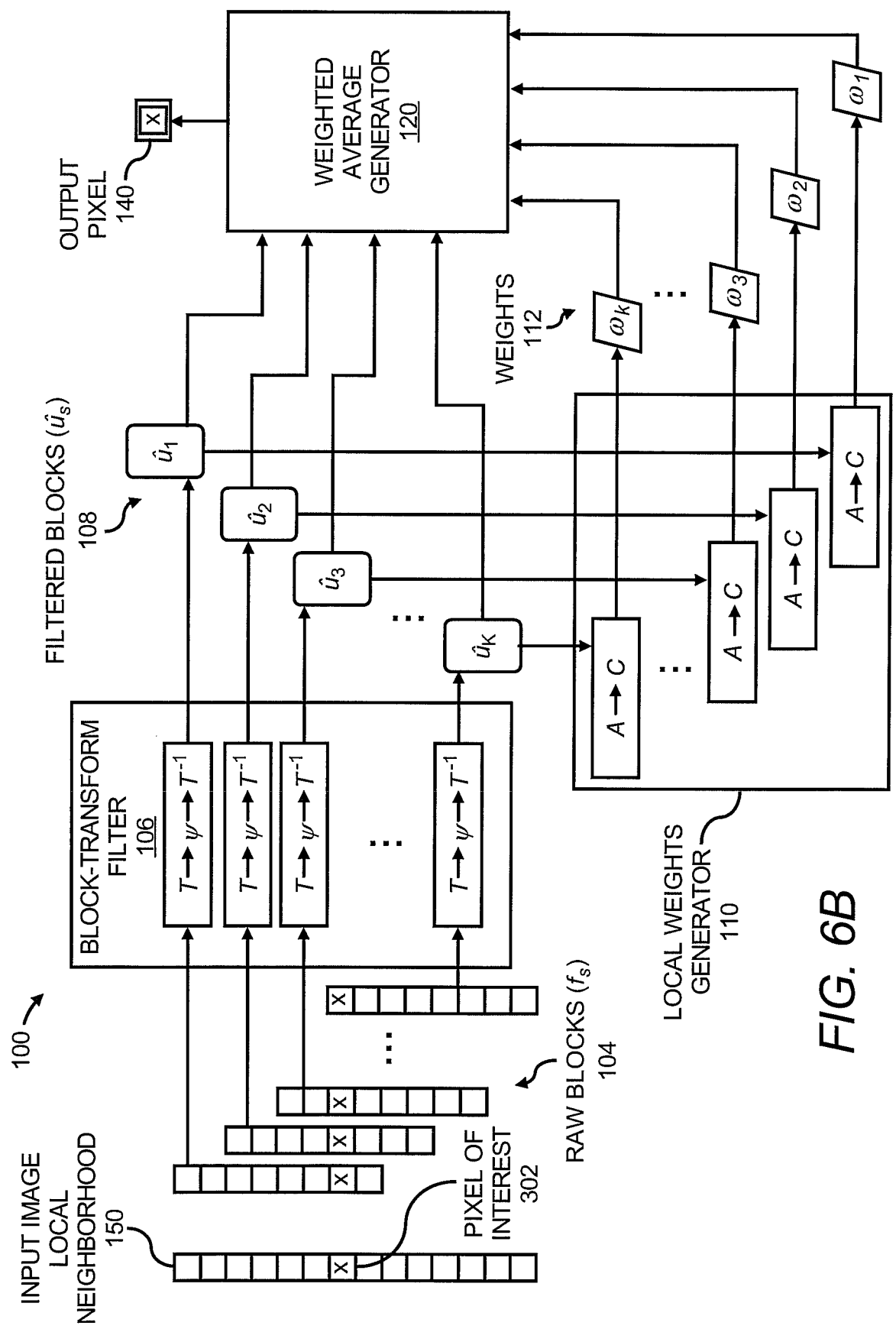

In order to suppress ringing artifacts, or other types of compression artifacts near edges, for instance, a local weights generator 110 assigns relatively greater weights $w_s$(b,m) to those candidate reconstructions $\hat{u}_s$(b,m) that are less likely to be corrupted by ringing artifacts or other types of distortions relative to the other candidate reconstructions $\hat{u}_s$(b,m). The ringing likelihood is estimated based on a local activity measure (A) computed from a neighborhood of each pixel in the candidate reconstruction $\hat{u}_s$(b,m), that is, after operation of the block-transform filter 106 (FIG. 6B). Various examples of local activity measures (A) are discussed herein below.

The weights generated by the local weights generator 110 and corresponding to each of the candidate reconstructions ($\hat{u}_1, \hat{u}_2, \ldots, \hat{u}_k$) correspond to different block-grid shifts are inputted into a weighted average generator 120. The weighted average generator 120 is configured to receive both the candidate reconstructions $\hat{u}_s$(b,m) and their associated weights $w_s$(b,m) and to combine the candidate reconstructions based upon the values of these values (FIG. 3, block 54). More particularly, for instance, the weighted average generator 120 may calculate the artifact-reduced image $\hat{u}_{AR}$(n) through implementation of Equation (3) discussed above. In addition, the weighted average generator 120 may combine the candidate reconstructions ($\hat{u}_1, \hat{u}_2, \ldots, \hat{u}_k$) to reduce compression artifacts in a plurality of color planes 40.

With reference now to FIG. 6B, there is shown a flow diagram of the system 100 depicted in FIG. 6A. The system 100 depicted in FIG. 6B depicts the system in a greater level of detail. In addition, the system 100 depicted in FIG. 6B provides an example of how an input image is processed on a per-pixel basis for a pixel of interest 302 in accordance with an embodiment of the invention.

In the system 100, an input image 12, which may have been encoded, for instance, through the compression technique discussed above with respect to FIG. 2, may be decompressed (FIG. 3, block 42). The system 100 depicts a local neighborhood 150 of the input image. As shown therein, one of the pixels contained in the local neighborhood 150 is labeled as the pixel of interest 302, which may be defined as the current pixel being processed for artifact-reduction. In addition, therefore, the remaining pixels contained in the input image 12 may be processed either concurrently or during future iterations the method depicted in FIG. 3.

In any regard, spatially-shifted forward transforms may be computed from the decompressed image data 62 (FIG. 3, block 44). More particularly, a forward transform operation is applied to local neighborhood 150 to produce multiple respective sets of local neighborhoods 104 that have been block-grid shifted with respect to each other, and that contain the pixel of interest 302. In addition, the forward transform coefficients 46 of each of the local neighborhoods 104 are nonlinearly mapped (FIG. 3, block 48).

In other words, following operation of block 48, the decompressed image data is divided into multiple sets of a plurality of raw blocks ($f_s$) or neighborhoods 104, where the pixel of interest 302 has different contexts in each of the block-grid shifted neighborhoods 104. The boundaries of the plurality of raw blocks ($f_s$) 104 contained in one local neighborhood 104 differs or is block-grid shifted with respect to the plurality of raw blocks ($f_s$) 104 contained in the remaining local neighborhoods. As such, the local neighborhoods 104 represent different partitions of the raw image into non-overlapping blocks. By way of example, each of the local neighborhoods 104 may contain a plurality of non-overlapping 8×8 pixel blocks and the blocks may be shifted by one or more pixels in each of the different local neighborhoods 104.

The raw block sets of each of the shifted local neighborhoods 104 are inputted into a block-transform filter 106, where inverse shifted block-transforms of each of the raw block sets 104 are computed (FIG. 3, block 50), for instance, as described with respect to the modules 66-70 in FIG. 4 above. The output of the block-transform filters 106 are candidate reconstructions ($\hat{u}_s$) 108 of each of the shifted local neighborhoods 104 containing the pixel of interest 302 to be filtered. Filtered blocks ($\hat{u}_s$) 108 and candidate reconstructions are used interchangeably herein.

As further shown in FIG. 6B, each of the candidate reconstructions ($\hat{u}_s$) 108 are inputted into the local weights generator 110. The local weights generator 110 is configured to calculate per-pixel relative weights 112 of the candidate reconstructions ($\hat{u}_s$) 108 (FIG. 3, block 52). More particularly, the system 100 obtains multiple candidate reconstructions ($\hat{u}_1, \hat{u}_2, \ldots, \hat{u}_k$) 108 in which the block-grid location in which a pixel of interest 302 is located differs in each of the candidate reconstructions ($\hat{u}_1, \hat{u}_2, \ldots, \hat{u}_k$) 108 (as shown in the block diagram 300 in FIG. 7). As such, the pixels contained in the local neighborhood of the pixel of interest 302 for each of the candidate reconstructions ($\hat{u}_1, \hat{u}_2, \ldots, \hat{u}_k$) 108 differs in each of the candidate reconstructions ($\hat{u}_1, \hat{u}_2, \ldots, \hat{u}_k$) 108.

In calculating the per-pixel relative weights 112 of the candidate reconstructions ($\hat{u}_1, \hat{u}_2, \ldots, \hat{u}_k$) 108 at block 52, the local weights generator 110 determines activity measures ($A_s$) for each of the blocks in the different candidate reconstructions ($\hat{u}_1, \hat{u}_2, \ldots, \hat{u}_k$) 108 to obtain relative self-confidences ($C_s$) of each of the candidate reconstructions ($\hat{u}_s$) or the value of reconstruction at the pixel of interest 302. As such, for each of the candidate reconstructions ($\hat{u}_s$), each of the block-wise activity measures ($A_s$) has a different context (that is, pixels contained in the 8×8 blocks) from which the activity measure is determined. Consequently, for instance, the activity measure ($A_{s1}$) of a block 304a in one candidate reconstruction ($\hat{u}_{s1}$) may have a different value as compared with the activity measure ($A_{s2}$) of the block 304b in a second candidate reconstructions ($\hat{u}_{s2}$) because the activity measures are determined based upon differing sets of pixel values. Each of the block-wise activity measures ($A_s$) and therefore the derived relative self-confidences ($C_s$) have a different context and the per-pixel relative weights ($w_s$) are derived from the relative self-confidences ($C_s$).

The relative preference between two possible candidate reconstructions $\hat{u}_s(b,m)$ at block-grid shifts s1 and s2 are defined as the ratio between the respective activity measures (A) raised to some negative power –p, for instance, ~0.5-1.0. This inverse power law is regularized by a small positive constant E to avoid divergence or instability when the activity measure is small, for instance, in flat blocks. The relative preference $R_{s1,s2}(b,m)$ may thus be defined according to the following equation:

$$R_{s1,s2}(b, m) = \left( \frac{\varepsilon + A[\hat{u}_{s1}(b, m)]}{\varepsilon + A[\hat{u}_{s2}(b, m)]} \right)^{-p}. \quad \text{Equation (4)}$$

Because Equation (4) is monotonically decreasing, the candidate reconstruction $\hat{u}_s(b,m)$ with the higher activity measure (A) has a lower relative preference. In addition, a property of Equation (4) is that it is homogeneous, in that, it depends only on ratios between a function of each activity measure (A). As such, the relative preference may be expressed as the ratio of two self-confidence attributes $C_s$ that are computed for each block-grid shift separately.

$$R_{s1,s2}(b, m) = \frac{C_{s1}(b, m)}{C_{s2}(b, m)} \quad \text{Equation (5)}$$

where $C_s(b,m) \equiv (\varepsilon + A[\hat{u}_s(b,m)])^{-p}$.

Consequently, by setting the per-pixel relative weight to be the self confidence expression $w_s(b,m) = C_s(b,m)$, the expression in the numerator and the denominator in Equation (5) are sums of quantities that may be computed a shift at a time, without the need to cache intermediate results or access them for later computations. This property enables an efficient application of embodiments of the invention in hardware systems that have limited cache memory, such as ASIC, or excessive memory access latency such as GPUs (Graphical Processing Units).

Generally speaking, the local weights generator 110 selects an activity measure (A) that provides relatively good de-ringing, while retaining relatively good de-blocking capabilities, and preserving genuine edges. In addition, the activity measure (A) is computed based on some quantity that is related to the magnitude of differences between the pixels contained in a local neighborhood, for instance, the pixels contained in an 8×8 block of pixels. The activity measure (A) may comprise, for instance, the variance of the collection of pixels in the local neighborhood, the difference between the minimum and maximum values, the mean of absolute differences between each pair of pixels, etc.

Thus, in one regard, a block may be considered to be more active (have a higher activity measure) if there is a relatively large variability among the pixels contained in that block, as may occur when the block contains an edge, a strong texture, etc. More particularly, if there is a relatively strong edge anywhere in a block, it induces large amplitudes of high frequency components which overlap part of the high-frequencies related to ringing artifacts in that block. Therefore, the mere presence of a relatively strong edge within a block severely limits the ability of the block-transform filter 106 to reduce the ringing artifacts all across that block, since it does not suppress strong components in order to preserve edges.

However, because the system 100 measures the block-wise activity after the operation of the block transform filter 106, a relatively high activity level indicates the presence of an edge, which indirectly indicates that if there were artifacts anywhere in that block, the block-transform filter 106 most likely not did not properly clean those artifacts. As such, the self-confidence measure (C) that is derived from the activity measure (A) computed over the entire block may be applied to each pixel included in that block, since the plausibility of remaining artifacts is not local but across the block. That is, the computed self-confidence measure (C) is distributed to each of the pixels included in that block.

For each block, the block-activity measure A is computed from the same pixel-set as the filtered reconstruction for that block $A[\hat{u}_s(b,m)]$. As such, the activity measure A may be defined in the transform domain and frequency weighting may relatively easily be applied to enable the activity measure to be tuned to better respond to artifacts or edges. By way of example, the block-variance corresponds to the sum of squares of all AC coefficients in the block (assuming a unitary transform like DCT). The block-variance measure may be generalized by frequency weighting matrix $\alpha_k$ where the $k^{th}$ entry corresponds to the $k^{th}$ 2D-transform coefficient as shown in the following equation:

$$A_s(b) = \Sigma_{k\neq 0}\alpha[\Sigma_m T_{k,m}\hat{u}_s(b,m)]^2 = \Sigma_{k\neq 0}\alpha_k\cdot[\psi_k(\sigma_k|\Sigma_j T_{k,j}f_s(b,j))]^2 \forall b,s. \quad \text{Equation (6):}$$

In Equation (6), $A_s(b)$ denotes a block-activity for block b at block-grid shift s, T denotes the block transform employed, and $\psi_k$ denotes the set of non-linear mappings that are each applied to their corresponding transform coefficient k.

According to an example, the local weights generator 110 selects a frequency weighting matrix $\alpha$ that is more responsive to edges and lines than to textures, since ringing artifacts are much more likely and much more visually disturbing near edges than on textures, and it is relatively difficult to differentiate between ringing artifacts and textures. For instance, the local weights generator 110 may select the frequency weighting matrix to be $\alpha_k \sim [(1+k_x)(1+k_y)]^{-1}$, which generally accentuates the contribution of edge features to the activity measure relative to less ordered features.

The weights $(w_1, w_2, \ldots, w_n)$ 112 generated by the local weights generator 110 and corresponding to each of the candidate reconstructions $(\hat{u}_1, \hat{u}_2, \ldots, \hat{u}_k)$ 108 are inputted into the weighted average generator 120. The weighted average generator 120 is configured to determine the output pixel 140 value from the per-pixel relative weights $(w_1, w_2, \ldots w_n)$ 112 and the candidate reconstructions $(\hat{u}_1, \hat{u}_2, \ldots, \hat{u}_k)$ 108. The output pixel 140 may then be written into an appropriate output buffer and the data contained in the buffer may be used to reproduce an artifact-reduced version of the input image 62.

According to another example, the local weights generator 110 may employ a modified weighting scheme that enhances control over feature preservation as compared with the relative weight $w_s(b,m)$ based upon block-wise self-confidence $C_s(b,m)$. As discussed above, each candidate reconstruction $\hat{u}_s(b,m)$ is weighted according to a block-wise activity $w[A_s(b)]$. However, for pixels at or near features, such as, edges and lines, the candidate reconstructions from different block-grid shifts $(\hat{u}_{s1}(b,m), \hat{u}_{s2}(b,m), \ldots, \hat{u}_{sk}(b,m))$ may have very different values, even if their corresponding activity measures are similar. In order to better preserve features in these situations, those candidate reconstructions $(\hat{u}_{s1}(b,m), \hat{u}_{s2}(b,m), \ldots, \hat{u}_{sk}(b,m))$ that are closer in value to the corresponding pixel value in the unfiltered JPEG image are given preference. This type of weighting mechanism is generally known as "photometric weighting." One solution to enhancing control over feature preservation is to multiply the block-activity based weight by a photometric weight, which is a decreasing function $g()$ of the difference between the reconstruction $\hat{u}_s(b,m)$ and the original pixel value in that location (n), $g_{\sigma(n)}(|\hat{u}_s(n)-f(n)|)$. By way of example, the system 100 may employ the following photometric function:

$$g_\sigma(t) = \frac{1}{1+\left(\frac{t}{\sigma}\right)^2}. \quad \text{Equation (7)}$$

The selectivity of the photometric function g depends on a local feature-contrast scale $\sigma(n)$ that characterizes what differences are considered to correspond to a "feature". For instance, $g_\sigma(0)=1$, $g_\sigma(\sigma)\sim 0.5$, and $g_\sigma(t>>\sigma)<<1$. Note that if a photometric weighting is applied with a uniform scale parameter across the image, not only are the edges preserved, but the artifacts may also be over-protected from being filtered out, since local differences in regions with ringing artifacts may be as high as a genuine image features. The local weights generator 110 may avoid this situation by letting the feature contrast scale parameter depend locally on a feature detector that is insensitive to spatially ordered edge/line features, but is sensitive to non-ordered features such as ringing artifacts, for example a high-order mixed derivative operator ($D_{xxyy}$). For pixels which have a relatively large response to that detector are identified as "artifact pixels" and the local weights generator 110 takes the feature-contrast scale to be high, which reduces the sensitivity of the photometric function g and effectively disables the feature-preservation mechanism so that the artifact may be filtered out. For pixels that have relatively low responses to that detector are identified as "non-artifact pixels" and the local weights generator 110 actively prefers reconstructions that are closer to the original unfiltered value because the photometric function becomes more sensitive and performs its feature preserving role, for instance.

$$\sigma(n) = \max(\sigma_0, |D_{xxyy} * f|); \quad \text{Equation (8)}$$

$$D_{xxyy} = [1 \ -2 \ 1] \otimes \begin{bmatrix} 1 \\ -2 \\ 1 \end{bmatrix} = \begin{bmatrix} 1 & -2 & 1 \\ -2 & 4 & -2 \\ 1 & -2 & 1 \end{bmatrix},$$

where the "*" denotes a linear convolution, $D_{xxyy}$ is the convolution mask corresponding to a feature detector that is sensitive to non-ordered features but not to ordered features like straight edges and lines, and where $\sigma_0$ is a positive regularizing parameter to avoid zero division.

The modified weighting scheme $w_s(b,m)$ may thus be written as:

$$w_s(b,m) = C_s(b)\cdot g_{\sigma(n)}(|\hat{u}_s(n)-f_s(n)|). \quad \text{Equation (9):}$$

In any regard, the weighted average generator 120 may also upsample the color component image planes (for instance, Cr and Cb) to the original resolution and may convert the resulting image planes back to the color space (for instance, the Red-Green-Blue color space) of the original image 10 (FIG. 3, block 56). The weighted average generator 120 may then combine the image planes to produce the output image 40.

The operations set forth in the methods disclosed herein may be contained as one or more utilities, programs, or sub-programs, in any desired computer accessible or readable medium. In addition, the methods disclosed herein may be embodied by a computer program, which can exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 8:
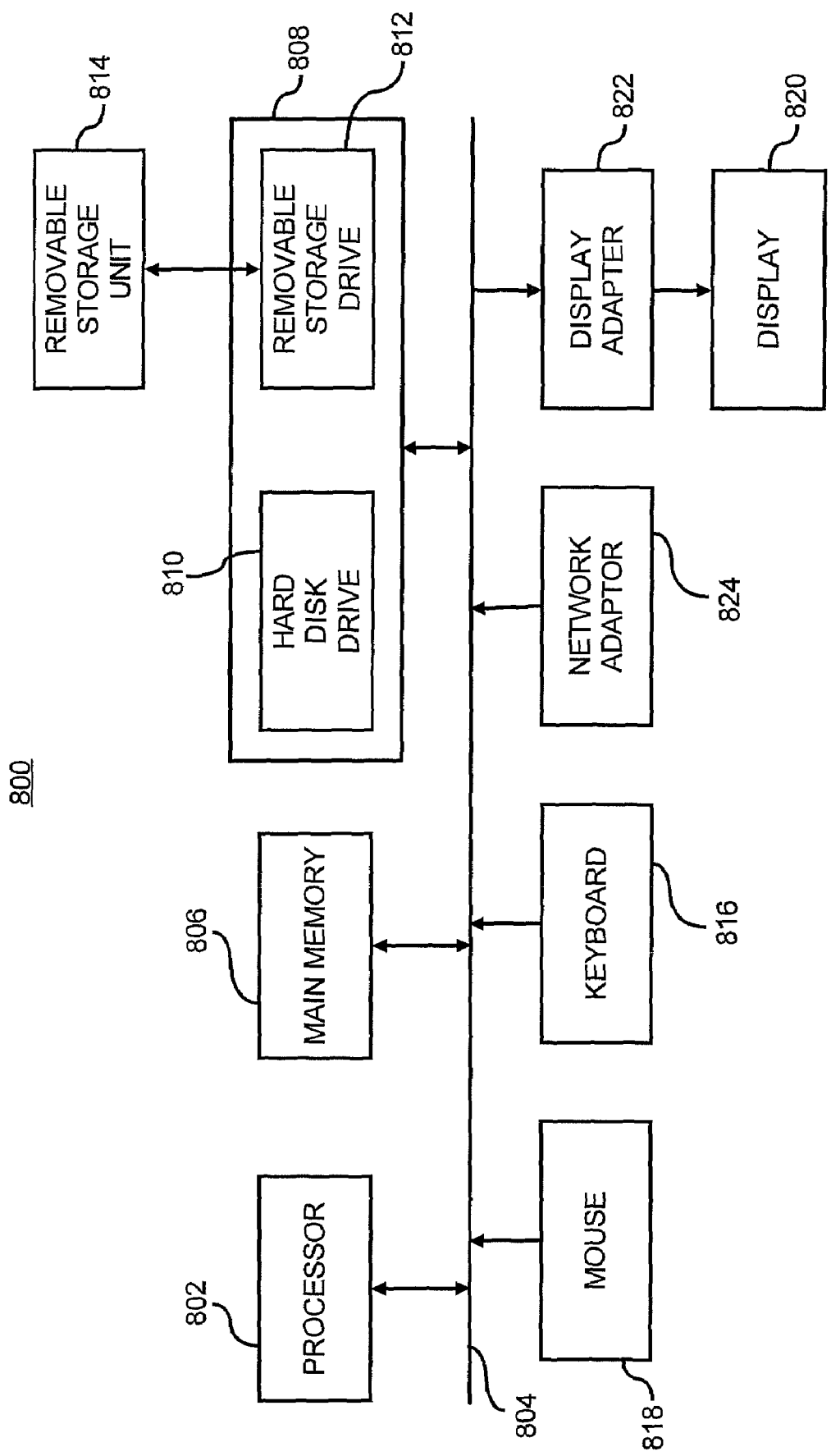
FIG. 8 illustrates a computer system, which may be employed to perform various functions of systems depicted in FIGS. 4 and 6, according to an embodiment of the invention.

FIG. 8 illustrates a computer system 800, which may be employed to perform the various functions of the systems 60 and 100 described herein above with, according to an example. In this respect, the computer system 800 may be used as a platform for executing one or more of the functions described hereinabove with respect to the systems 60 and 100.

The computer system 800 includes a processor 802, which may be used to execute some or all of the steps described in the methods disclosed herein. Commands and data from the processor 802 are communicated over a communication bus 804. The computer system 800 also includes a main memory 806, such as a random access memory (RAM), where the program code may be executed during runtime, and a secondary memory 808. The secondary memory 808 includes, for example, one or more hard disk drives 810 and/or a removable storage drive 812, representing a floppy diskette drive, a magnetic tape drive, a compact disk drive, etc., where a copy of the program code for processing a compressed image may be stored.

The removable storage drive 810 reads from and/or writes to a removable storage unit 814 in a well-known manner. User input and output devices may include a keyboard 816, a mouse 818, and a display 820. A display adaptor 822 may interface with the communication bus 804 and the display 820 and may receive display data from the processor 802 and convert the display data into display commands for the display 820. In addition, the processor 802 may communicate over a network, for instance, the Internet, LAN, etc., through a network adaptor 824.

It will be apparent to one of ordinary skill in the art that other known electronic components may be added or substituted in the computer system 800. In addition, the computer system 800 may include a system board or blade used in a rack in a data center, a conventional "white box" server or computing device, etc. Also, one or more of the components in FIG. 8 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A method for processing an input image to reduce compression-related artifacts, said method comprising:
  generating a plurality of block transforms of the input image having respective plurality of block-grid locations, wherein each of the block-grid locations is shifted with respect to the block-grid locations in each of the other block transformed images;
  generating a plurality of respective intermediate transform domain filtered images having modified transform coefficients;
  assigning per-pixel relative weights to each of the intermediate transform domain filtered images, wherein each of the intermediate transform domain filtered images has different contexts, and wherein the per-pixel relative weights are adaptive to the local context in each of the intermediate transform domain filtered images;
  computing a weighted average of inverse-transforms of the intermediate transform domain filtered images from the per-pixel relative weights to produce a artifact-reduced image; and
  outputting the artifact-reduced image.

2. The method according to claim 1, further comprising:
  computing an inverse block transform of the intermediate transform domain filtered images to generate a plurality of respective candidate reconstructions; and
  wherein assigning the per-pixel relative weights further comprises calculating the per-pixel relative weights from either the intermediate transform domain filtered images or the respective candidate reconstructions.

3. The method according to claim 2, further comprising:
  combining one of the plurality of intermediate transform domain filtered images and the plurality of candidate reconstructions along with their corresponding per-pixel relative weights to produce the artifact-reduced image by multiplying values of the intermediate transform domain filtered images or the candidate reconstructions with their corresponding per-pixel relative weights to obtain respective products and accumulating the products to obtain a summed product per-pixel, and by accumulating the relative weights to obtain a normalization sum per-pixel and dividing the summed product per-pixel by the normalization sum per-pixel.

4. The method according to claim 3, further comprising:
  accumulating the product of the per-pixel relative weights with one of the plurality of intermediate transform domain filtered images and the plurality of candidate reconstructions and accumulating a sum of per-pixel weights for producing the artifact-reduced image without having to store intermediate per-pixel weights, thereby improving the computational efficiency in processing the input image and increasing a range of hardware platforms that accommodate the processing.

5. The method according to claim 2, further comprising:
  combining one of the plurality of intermediate transform domain filtered images and the plurality of candidate reconstructions ($\hat{u}_s(b,m)$) along with their corresponding per-pixel relative weights ($w_s(b,m)$) to produce the artifact-reduced image ($\hat{u}_{AR}(n)$) according to the following equation:

$$\hat{u}_{AR}(n) = \frac{\sum_s \sum_{b,m} \delta(n, 8b+m+s) \cdot w_s(b,m) \cdot \hat{u}_s(b,m)}{\sum_s \sum_{b,m} \delta(n, 8b+m+s) \cdot w_s(b,m)},$$

wherein n is a pixel address of a pixel of interest, b is a block-index of the pixel of interest, m is the block in which the pixel of interest is located, s denotes the shift of the block-transform grid, and $\delta(n1,n2)$ is 1 if n1=n2 and 0 otherwise.

6. The method according to claim 2, wherein assigning the per-pixel relative weights to one of the plurality of intermediate transform domain filtered images and the plurality of candidate reconstructions further comprises determining activity measures of each of the blocks aligned with the shifted block-transform grid in the intermediate transform domain filtered images or the candidate reconstructions to obtain relative self-confidences of each of the intermediate transform domain filtered images or the candidate reconstructions with respect to a pixel of interest.

7. The method according to claim 6, wherein determining the activity measure per each block in one of the plurality of intermediate transform domain filtered images and the plurality of candidate reconstructions further comprises computing the activity measures based upon a quantity that is related to a magnitude of differences between the pixels contained in the respective blocks of the shifted block-transform grid corresponding to that intermediate transform domain filtered image or candidate reconstruction.

8. The method according to claim 7, wherein the activity measure is block variance computed from one of directly from the pixel values and from transform coefficient values.

9. The method according to claim 8, wherein determining the activity measures further comprises determining the activity measures $A_s(b)$ for each of the blocks b in one of the plurality of intermediate transform domain filtered images and the plurality of candidate reconstructions ($\hat{u}_s(b,m)$), which are frequency-weighted variances, for a block-grid shift s based upon the following equation:

$$A_s(b)=\Sigma_{k\neq 0}\alpha[\Sigma_m T_{k,m}\hat{u}_s(b,m)]^2=\Sigma_{k\neq 0}\alpha_k\cdot[\psi_k(\sigma_k|\Sigma_j T_{k,j}f_s(b,j))]^2 \forall b,s,$$

wherein b is a block-index of the pixel of interest, m is the block in which the pixel of interest is located s denotes the shift of the block-transform rid $\alpha$ and $\alpha_k$ are frequency weighting matrices, $\sigma_k$ is a local feature-contrast scale, k corresponds to the kth 2D-transform coefficient, j denotes indices of the quantization element, f is the compressed image, T denotes the block transform employed, and $\Psi_k$ denotes the set of non-linear mappings that are each applied to their corresponding transform coefficient k.

10. The method according to claim 6, wherein assigning per-pixel relative weights of one of the plurality of intermediate transform domain filtered images and the plurality of candidate reconstructions further comprises assigning relatively lower self-confidences to the pixels in the intermediate transform domain filtered images or the candidate reconstructions having relatively higher activity measures and assigning relatively higher self-confidences to the pixels in the intermediate transform domain filtered images or the candidate reconstructions having relatively lower activity measures.

11. The method according to claim 10, wherein assigning per-pixel relative weights between two intermediate transform domain filtered images or between two candidate reconstructions corresponding to two shifts of block-grids (s1) and (s2) further comprises calculating per-pixel relative weights based upon the following equation to determine a relative preference ($R_{s1,s2}(b,m)$) between the two intermediate transform domain filtered images or the two candidate reconstructions (s1) and (s2):

$$R_{s1,s2}(b,m)=\frac{C_{s1}(b,m)}{C_{s2}(b,m)}$$

where $C_s(b,m)\equiv(\epsilon+A[\hat{u}_s(b,m)])^{-p}$, wherein b is a block index of the pixel of interest, m is the block in which the pixel of interest is located, $C_s(b,m)$ is a per-pixel self-confidence attribute, e small positive constant, $-p$ is a negative power, and $A[\hat{u}_s(b,m)]$ is a per-pixel activity measure of an intermediate transform domain filtered image or a candidate reconstruction.

12. The method according to claim 2, wherein assigning per-pixel relative weights of one of the plurality of intermediate transform domain filtered images and the plurality of candidate reconstructions further comprises calculating the per-pixel relative weights $w_s(b,m)$ in a manner designed to protect desired features from filtering while allowing artifacts to be filtered according to the following equation:

$$w_s(b,m)=C_s(b)\cdot g_{\sigma(n)}(|\hat{u}_s(n)-f_s(n)|),$$

wherein $C_s(b)$ is a self-confidence attribute measure for block b and a shift s, n is a pixel address of a pixel of interest, m is the block in which the pixel of interest is located, $g_\sigma(t)$ is a decreasing function of the difference between $\hat{u}_s(b,m)$ and the original pixel value in that location $f_s(n)$ divided by a positive local feature contrast scale $\sigma(n)$, such that $g_\sigma(0)=1$, $g_\sigma(\sigma)\sim0.5$, $g_\sigma(t\gg\sigma)\ll1$, and the local feature contrast scale $\sigma(n)$ is computed per pixel by a feature detector that is insensitive to the features desired for protection, and sensitive to artifacts desired to be filtered.

13. The method according to claim 12, wherein the local characteristic feature contrast scale is computed according to the following equation:

$$\sigma(n)=\max(\sigma_0,|D_{xxyy}*f|);$$

$$D_{xxyy}=[1\ -2\ 1]\otimes\begin{bmatrix}1\\-2\\1\end{bmatrix}=\begin{bmatrix}1&-2&1\\-2&4&-2\\1&-2&1\end{bmatrix},$$

wherein the "*" denotes a linear convolution, $D_{xxyy}$ is the convolution mask corresponding to a feature detector that is sensitive to non-ordered features but not to ordered features like straight edges and lines, and where $\sigma_0$ is a positive regularizing parameter to avoid zero division.

14. A system for processing an input image to reduce compression-related artifacts, said system comprising:
a processor to implement:
a forward transform module configured to generate a plurality of block transforms of the input image having respective plurality of block-grid locations, wherein each of the block-grid locations is shifted with respect to the block-grid locations in each of the other block transformed images, said forward transform module being further configured to generate a plurality of respective intermediate transform domain filtered images having modified transform coefficients;
a block transform filter configured to compute inverse transforms of the intermediate transform domain filtered images to generate a plurality of respective candidate reconstructions;
a local weights generator configured to assign per-pixel relative weights to one of the intermediate transform domain filtered images and the candidate reconstructions, wherein each of the intermediate transform domain filtered images and the candidate reconstructions has different contexts, and wherein the per-pixel relative weights are adaptive to the local context in each of the intermediate transform domain filtered images or candidate reconstructions;

a weighted average generator configured to compute a weighted average of one of the intermediate transform domain filtered images and the candidate reconstructions from the per-pixel relative weights to produce an artifact-reduced image; and an output for outputting the artifact-reduced image.

15. The system according to claim 14, wherein the weighted average generator is further configured to combine one of the plurality of intermediate transform domain images and the plurality of candidate reconstructions ($\hat{u}_s(b,m)$) along with their corresponding per-pixel relative weights ($w_s(b,m)$) to produce the artifact-reduced image ($\hat{u}_{AR}(n)$) according to the following equation:

$$\hat{u}_{AR}(n) = \frac{\sum_s \sum_{b,m} \delta(n, 8b+m+s) \cdot w_s(b,m) \cdot \hat{u}_s(b,m)}{\sum_s \sum_{b,m} \delta(n, 8b+m+s) \cdot w_s(b,m)},$$

wherein n is a pixel address of a pixel of interest, b is a block-index of the pixel of interest, m is the block in which the pixel of interest is located, s denotes the shift, and $\delta(n1,n2)$ is 1 if n1=n2 and 0 otherwise.

16. The system according to claim 15, wherein the local weights generator is further configured to accumulate the product of the per-pixel relative weights with one of the plurality of intermediate transform domain filtered images and the plurality of candidate reconstructions and accumulating a sum of per-pixel weights for producing the artifact-reduced image ($\hat{u}_{AR}(n)$) without having to store intermediate per-pixel weights, thereby improving the computational efficiency in processing the input image and increasing a range of hardware platforms that accommodate the processing.

17. The system according to claim 14, wherein the local weights generator is further configured to determine activity measures $A_s(b)$ for each of the blocks b in one of the plurality of intermediate transform domain filtered images and the plurality of candidate reconstructions ($\hat{u}_s(b,m)$), which are frequency-weighted variances for a block-grid shift s based upon the following equation:

$A_s(b) = \Sigma_{k \neq 0} \alpha [\Sigma_m T_{k,m} \hat{u}_s(b,m)]^2 = \Sigma_{k \neq 0} \alpha_k [\psi_k(\sigma_k | \Sigma_j T_{k,j} f_s(b,j))]^2 \forall b,s,$ wherein b is a block-index of the pixel of interest, m is the block in which the pixel of interest is located, s denotes the shift of the block-transform grid, $\alpha_k$ is a frequency weighting matrix, $\sigma_k$ is a local feature-contrast scale, k corresponds to the kth 2D-transform coefficient, j denotes indices of the quantization element, f is the compressed image, T denotes the block transform employed, and $\Psi_k$ denotes the set of non-linear mappings that are each applied to their corresponding transform coefficient k.

18. The system according to claim 14, wherein the local weights generator is further configured to calculate the per-pixel relative weights $w_s(b,m)$ in a manner designed to protect desired features from filtering while allowing artifacts to be filtered according to the following equation:

$w_s(b,m) = C_s(b) \cdot g_{\sigma(n)}(|\hat{u}_s(n) - f_s(n)|),$ wherein $C_s(b)$ is a self-confidence attribute measure for block b and a shift s, m is the block in which the pixel of interest is located, n is a pixel address of a pixel of interest, $g_o(t)$ is a decreasing function of the difference between $\hat{u}_s(b,m)$ and the original pixel value in that location $f_s(n)$ divided by a positive local feature contrast scale $\sigma(n)$, such that $g_o(0)=1$, $g_o(\sigma) \sim 0.5$, $g_o(t \gg \sigma) \ll 1$, and the local feature contrast scale $\sigma(n)$ is computed per pixel by a feature detector that is insensitive to the features desired for protection, and sensitive to artifacts desired to be filtered.

19. A computer readable storage medium on which is embedded one or more computer programs, said one or more computer programs implementing a method for processing an input image, said one or more computer programs comprising computer readable code for:

generating a plurality of block transforms of the input image having respective plurality of block-grid locations, wherein each of the block-grid locations is shifted with respect to the block-grid locations in each of the other block transformed images;

generating a plurality of respective intermediate transform domain filtered images having modified transform coefficients;

assigning per-pixel relative weights to each of the intermediate images, wherein each of the intermediate images has different contexts, and wherein the per-pixel relative weights are adaptive to the local context in each of the intermediate images;

computing a weighted average of inverse-transforms of the intermediate images from the per-pixel relative weights of the intermediate images to produce an artifact-reduced image; and outputting the artifact-reduced image.

20. The computer readable medium according to claim 19, said one or more computer programs further comprising computer readable code for:

combining each of the intermediate transform domain filtered images ($\hat{u}_s(b,m)$) along with their corresponding per-pixel relative weights ($w_s(b,m)$) to produce the artifact-reduced image ($\hat{u}_{AR}(n)$) according to the following equation:

$$\hat{u}_{AR}(n) = \frac{\sum_s \sum_{b,m} \delta(n, 8b+m+s) \cdot w_s(b,m) \cdot \hat{u}_s(b,m)}{\sum_s \sum_{b,m} \delta(n, 8b+m+s) \cdot w_s(b,m)},$$

wherein n is a pixel address of a pixel of interest, b is a block-index of the pixel of interest, m is the block in which the pixel of interest is located, s denotes the shift of the block-transform grid, and $\delta(n1,n2)$ is 1 if n1=n2 and 0 otherwise.

* * * * *

UNITED STATES PATENT AND TRADEMARK OFFICE
CERTIFICATE OF CORRECTION

PATENT NO. : 7,965,900 B2  Page 1 of 1
APPLICATION NO. : 11/862125
DATED : June 21, 2011
INVENTOR(S) : Ron Maurer et al.

It is certified that error appears in the above-identified patent and that said Letters Patent is hereby corrected as shown below:

In column 15, line 34, in Claim 9, delete "located" and insert -- located, --, therefor.

In column 15, line 35, in Claim 9, delete "rid" and insert -- grid, --, therefor.

In column 16, line 4, in Claim 11, delete "e" and insert -- $\varepsilon$ --, therefor.

In column 16, line 44, in Claim 13, delete "$\sigma_{\bar{o}}$" and insert -- $\sigma_0$ --, therefor.

Signed and Sealed this
Fourteenth Day of February, 2012

David J. Kappos
*Director of the United States Patent and Trademark Office*